United States Patent
Yang et al.

(10) Patent No.: US 7,068,735 B2
(45) Date of Patent: Jun. 27, 2006

(54) SYSTEM AND METHOD TO PERFORM DC COMPENSATION ON A RADIO FREQUENCY BURST IN A CELLULAR WIRELESS NETWORK

(75) Inventors: Baoguo Yang, Iselin, NJ (US); Nelson R. Sollenberger, Farmingdale, NJ (US)

(73) Assignee: Broadcom Corp., Irvine, CA (US)

( * ) Notice: Subject to any disclaimer, the term of this patent is extended or adjusted under 35 U.S.C. 154(b) by 0 days.

(21) Appl. No.: 10/786,376

(22) Filed: Feb. 25, 2004

(65) Prior Publication Data

US 2004/0252787 A1    Dec. 16, 2004

Related U.S. Application Data

(60) Provisional application No. 60/478,922, filed on Jun. 16, 2003.

(51) Int. Cl.
 *H04L 25/60* (2006.01)
 *H04L 25/10* (2006.01)
(52) U.S. Cl. .................. 375/319; 375/340; 375/324
(58) Field of Classification Search ............ 375/319, 375/340, 324
 See application file for complete search history.

(56) References Cited

U.S. PATENT DOCUMENTS

| | | | |
|---|---|---|---|
| 6,868,128 B1* | 3/2005 | Lane | 375/319 |
| 6,907,027 B1* | 6/2005 | Baills et al. | 370/345 |
| 2002/0064239 A1* | 5/2002 | Husth | 375/319 |

* cited by examiner

*Primary Examiner*—Stephen Chin
*Assistant Examiner*—Jia Lu
(74) *Attorney, Agent, or Firm*—Garlick, Harrison & Markison; Robert McLauchlan

(57) ABSTRACT

A method to perform DC compensation on a Radio Frequency (RF) burst transmitted between a servicing base station and a wireless terminal in a cellular wireless communication system that first receives the RF burst modulated according to either a first or second modulation format. Samples from the RF burst, or taken from the training sequence, are produced and averaged to produce a DC offset estimate. The DC offset estimate is then subtracted from each of the samples. The modulation format of RF burst may then be identified from the samples. Depending on the identified modulation format, the DC offset estimate may be re-added to the samples when a particular modulation format is identified as the modulation format of the RF burst. This decision is made based on how well various components within the wireless terminal perform DC offset compensation.

23 Claims, 12 Drawing Sheets

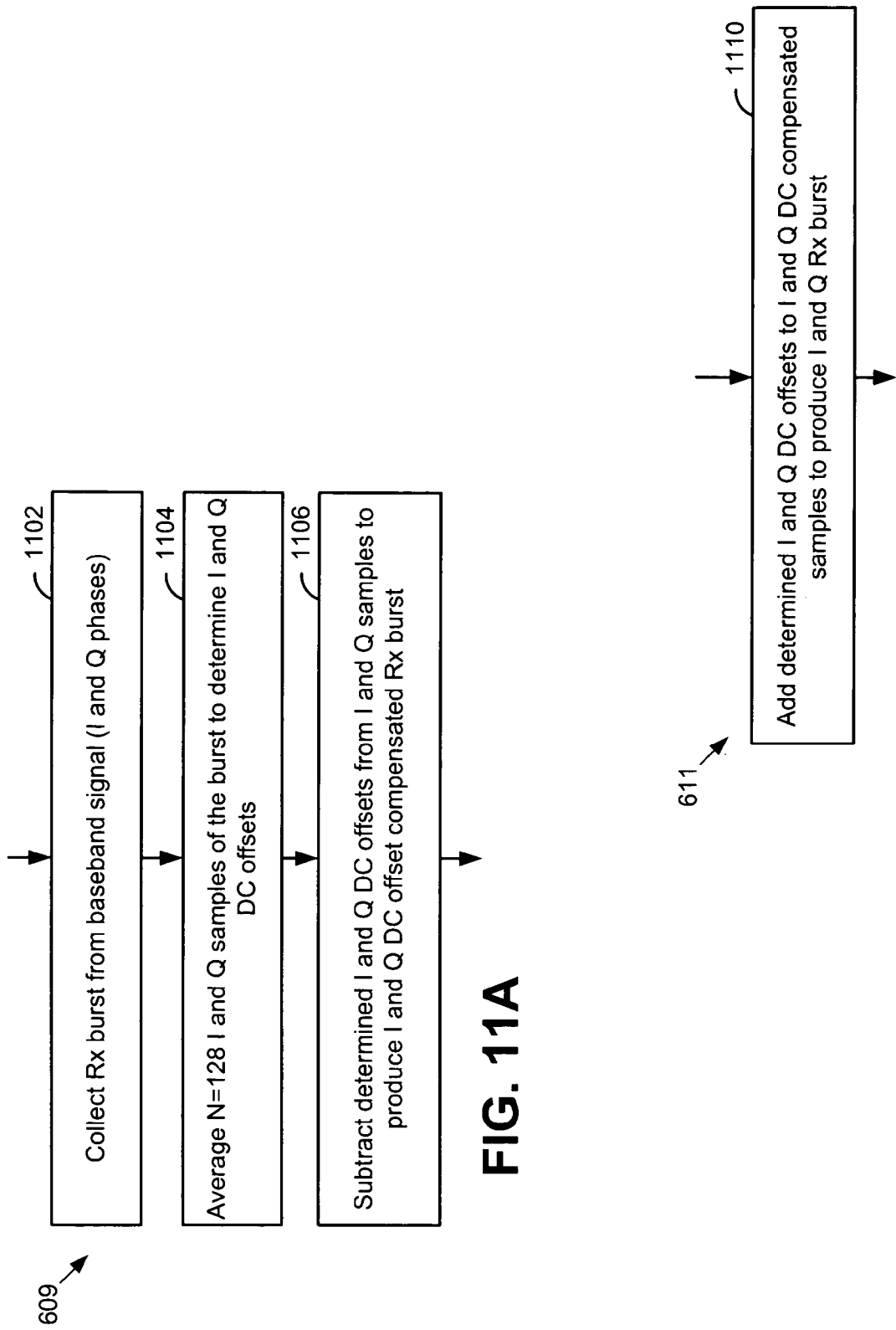

SYSTEM AND METHOD TO PERFORM DC COMPENSATION ON A RADIO FREQUENCY BURST IN A CELLULAR WIRELESS NETWORK

CROSS REFERENCES TO RELATED APPLICATIONS

This application claims priority to U.S. Provisional Patent Application Ser. No. 60/478,922, filed Jun. 16, 2003, which is incorporated herein by reference for all purposes.

BACKGROUND

1. Technical Field

The present invention relates generally to cellular wireless communication systems, and more particularly to a system and method to perform direct current (DC) compensation on a radio frequency (RF) burst in a cellular wireless network.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 20 ms frame that is divided into four sub-frames, each including eight slots of approximately 625 µs in duration. Each slot corresponds to a Radio Frequency (RF) burst having a left side, a midamble, and a right side. The midamble typically contain a training sequence whose exact configuration depends on modulation format used. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless terminals must be able to identify the modulation format of any RF burst for successful demodulation and receipt of the RF burst. Further, the modulation format used may cause the processing of the RF burst to vary and requires different signal and channel conditions. For example, the SNR/SIR requirements of the GMSK and 8PSK formats may vary. The 8PSK format needs a higher SNR being associated with the processed RF burst. The DC offset is typically worse for noisy channels in which a DC baseline cannot be determined by the RF front end. Thus low SNR baseband signals often have greater DC offset than high SNR baseband signals. More robust modulation schemes, such as GMSK, are typically used for noisy channels. Less robust modulation schemes, such as 8PSK, are typically used in less noisy channels. Thus, different processes may be desired to process signals having different modulation formats.

While the training sequence assists in processing the RF burst, properly selecting and processing the RF burst according to the modulation format, particularly in an environment where the modulation format may vary is problematic. The wireless terminal needs to immediately identify the modulation format in order to properly process the RF burst and effect proper communications. Thus, a need exists for a means to quickly and efficiently identify the modulation format for the wireless terminal without the wireless terminal performing unnecessary data processing. Once the modulation format is identified, the proper methodology to process the RF burst, including how to perform DC offset compensation, must be quickly effected.

BRIEF SUMMARY OF THE INVENTION

In order to overcome the shortcomings of prior devices, the present invention provides a system and method to perform DC compensation on a radio frequency (RF) burst transmitted between a servicing base station and a wireless terminal in a cellular wireless communication system. This method involves receiving the RF burst and converting the RF burst to a baseband signal. Typically, each data block contains 4 radio frequency (RF) bursts, where each of the 4 RF bursts uses the same modulation format. The RF burst is modulated according to either a first modulation format or a second modulation format. Such modulation formats may be GMSK, 8PSK, or other like modulation formats known to those skilled in the art. Samples from a baseband RF Burst are produced and averaged to produce a DC offset estimate. The DC offset estimate is then subtracted from each of the samples. The baseband RF Burst may include both In-phase (I phase) and Quadrature phase (Q phase. Samples from each phase are averaged to produce individual I phase and Q phase DC offset estimates. The modulation format of the RF burst may then be identified from the samples. Depending on the identified modulation format, the DC offset estimate may be re-added to the samples when a particular modulation format is identified as the modulation format of the RF burst. This decision is made based on how well various components within the wireless terminal perform DC offset compensation. For example, if the modulation format is 8PSK, the SNR/SIR of the burst received by the mobile is usually high and the RF front end satisfactorily performs DC offset compensation. Thus additional compensation by the baseband processor is not required. The compensation performed by the baseband processor is undone by re-adding the. DC offset estimate to the samples.

Another embodiment of the present invention provides a wireless terminal that operates within a cellular communication system. This wireless terminal has an RF front end, a baseband processor communicatively coupled to the RF front end, and an encoder/decoder (CODEC) processing module which if present is communicatively coupled to the baseband processor. These combinations of elements operate to receive a first RF burst, which may be modulated according to either a GMSK or 8PSK modulation format. The combination then produces a plurality of samples from the first RF burst, which are averaged to produce DC offset estimates. The DC offset estimates are then subtracted from each sample after which the modulation format of the RF burst is identified based on the samples themselves. If a particular modulation format is identified. It becomes necessary to re-add the DC offset estimate back into each sample when the particular modulation format is identified. Then, the combination operates to demodulate the DC compensated RF burst according to the identified modulation format.

Other features and advantages of the present invention will become apparent from the following detailed description of the invention made with reference to the accompanying drawings.

BRIEF DESCRIPTION OF THE DRAWINGS

FIGS. 11A and 11B are flow charts illustrating DC offset compensation operations based on the detected the modulation format of the RF burst according to an embodiment of the present invention.

DETAILED DESCRIPTION OF THE DRAWINGS

Figure 1:
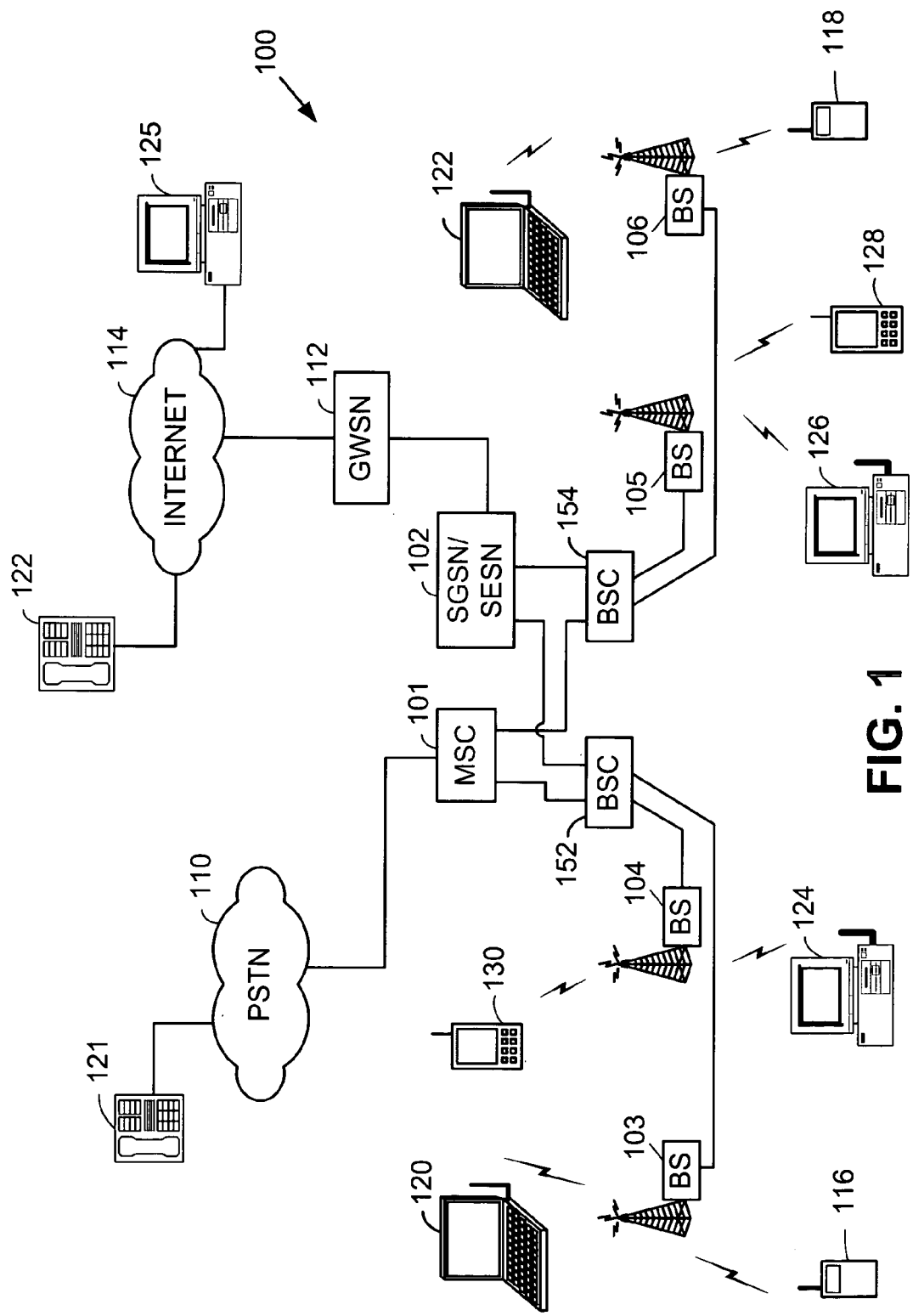
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VOIP) terminal 123 and a personal computer 125 couple to the Internet 114. The MSC 101 couples to the Public Switched Telephone Network (PSTN) 110.

Each of the base stations 103–106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc.

Wireless terminals 116, 118, 120, 122, 124, 126, 128, and 130 couple to the cellular wireless communication system 100 via wireless links with the base stations 103–106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116–130 are therefore enabled to support the GPRS and/or EDGE operating standard as well as supporting the voice servicing portions the GSM standard.

In particular, the wireless terminals 116–130 support the pipelined processing of received RF bursts in slots of a GSM frame so that a plurality of slots in each sub-frame of a GSM frame are allocated for forward link transmissions to a single wireless terminal. In one particular embodiment, a number of slots of a GSM frame are allocated for forward link transmissions to a wireless terminal such that the wireless terminal must receive and process a number of RF bursts, e.g., 2, 3, 4, or more RF bursts, in each sub-frame of the GSM frame. The wireless terminal is able to process the RF bursts contained in these slots and still service reverse link transmissions and the other processing requirements of the wireless terminal.

Figure 2:
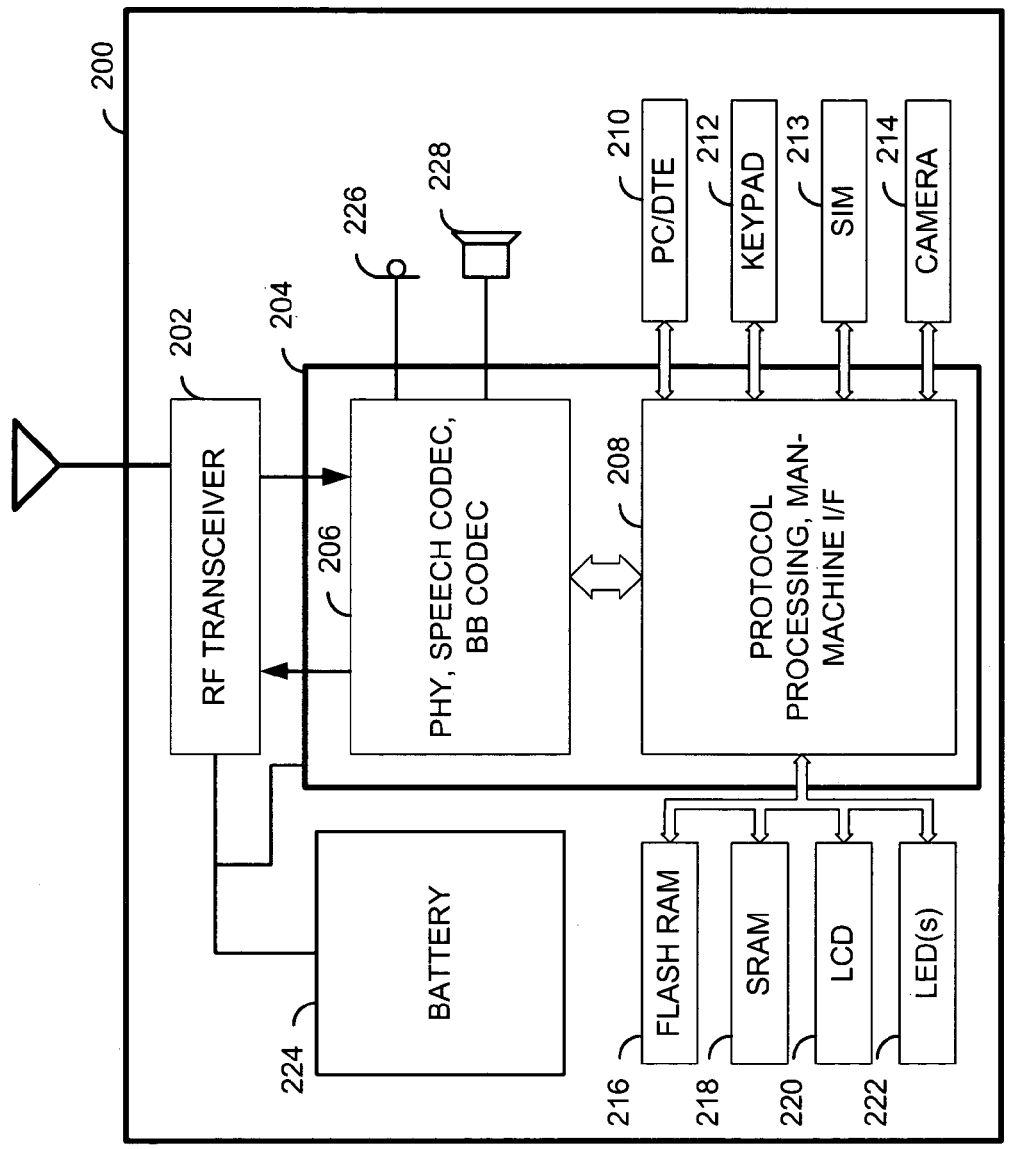
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
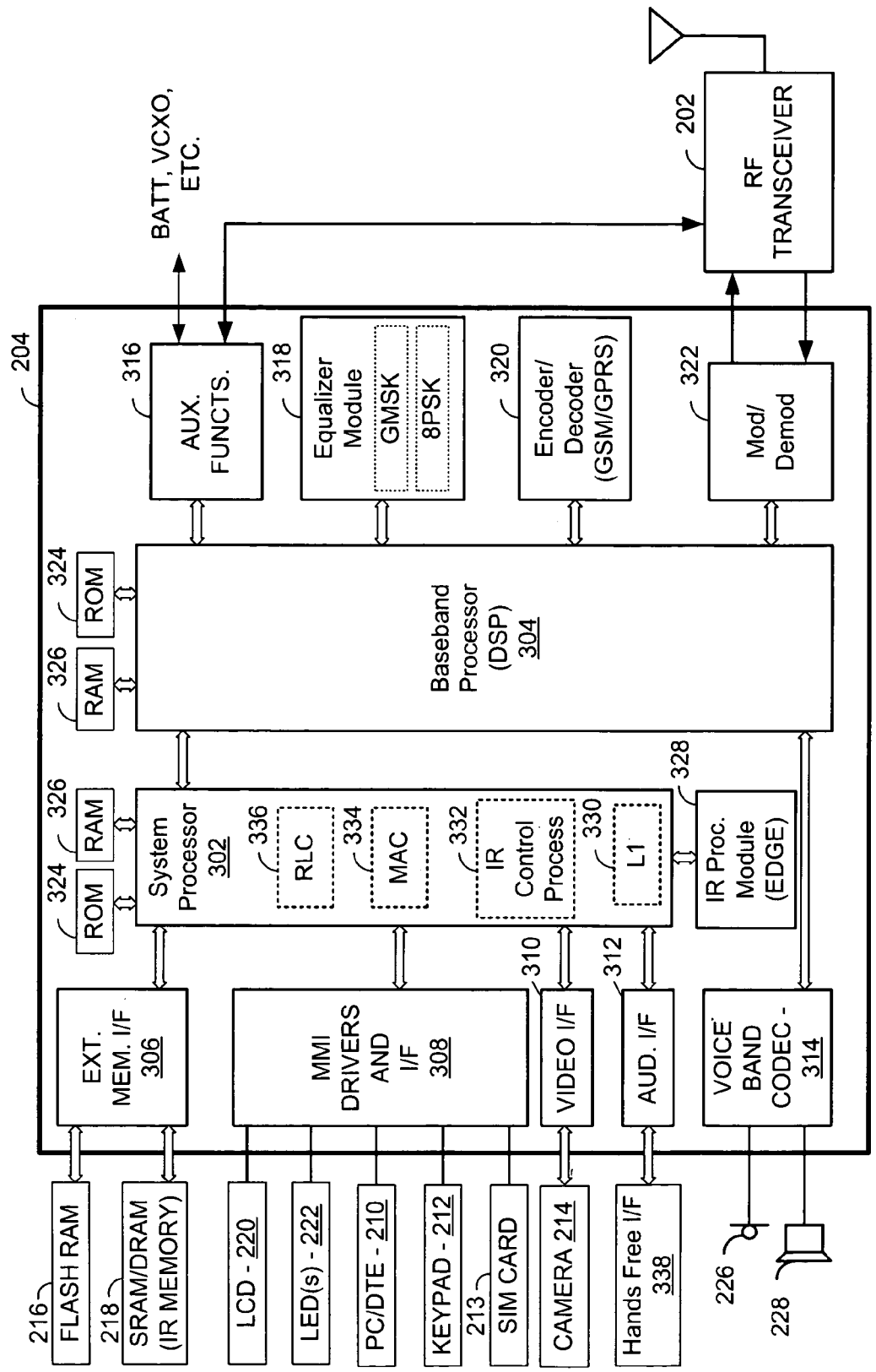
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further with reference to FIGS. 5–6B, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each sub-frame of a GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

Figure 4:
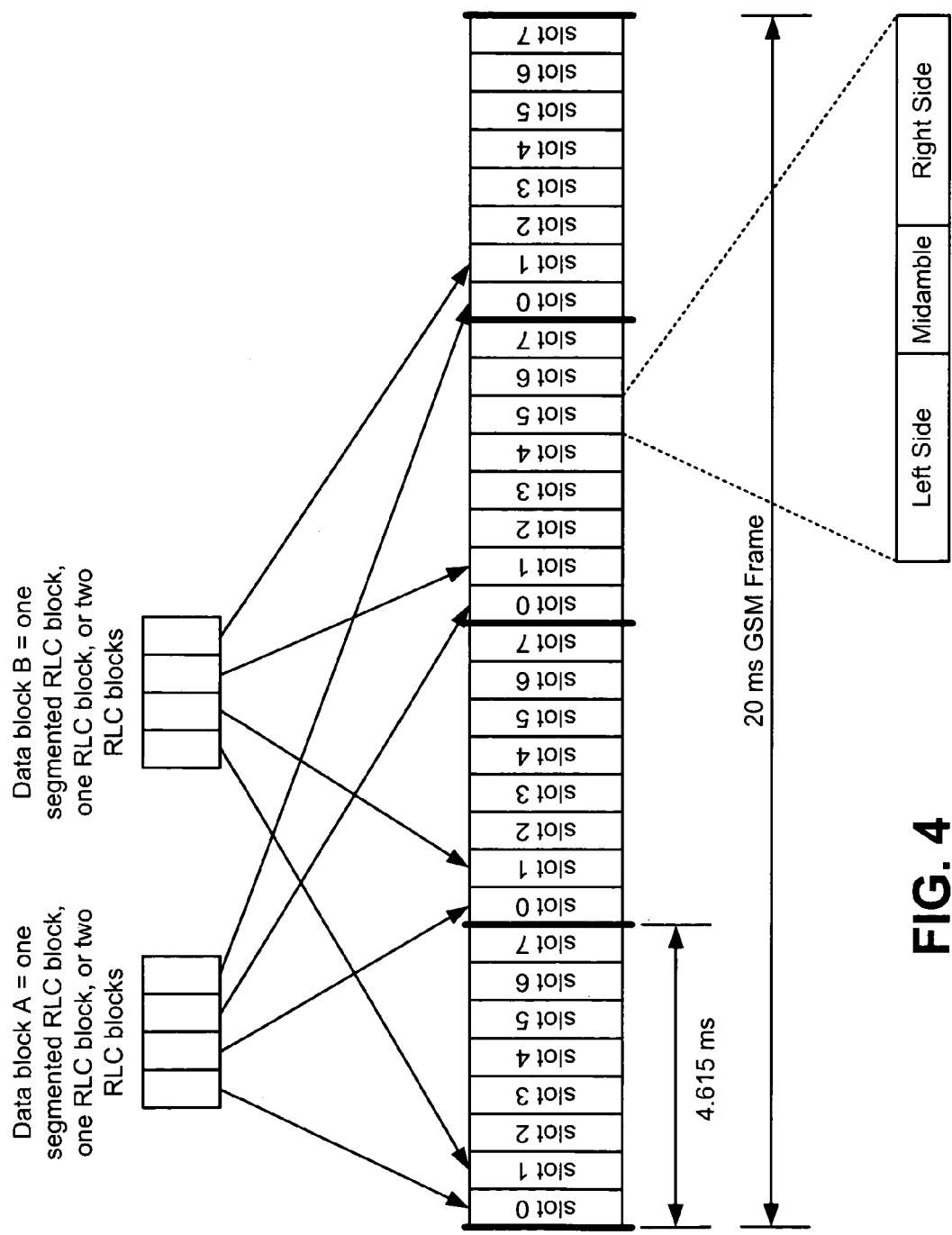
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, including guard periods, is divided into four sub-frames, and includes eight slots, slots 0 through 7, in each sub-frame. Each slot is approximately 577 μs in duration, includes a left side, a midamble, and a right side. The left side and right side of an RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode or GPRS CS-n mode, e.g., CS-1, CS-2. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode or CS mode of each set of slots, i.e., slot n of each sub-frame, for the GSM frame is consistent for the GSM frame. Further, the MCS mode or CS mode of differing sets of slots of the GSM frame, e.g., slot 0 of each sub-frame vs. any of slots 1–7 of each sub-frame, may differ. As will be described further with reference to FIG. 5, the wireless terminal 200 may be assigned multiple slots for forward link transmissions that must be received and processed by the wireless terminal 200.

Figure 5:
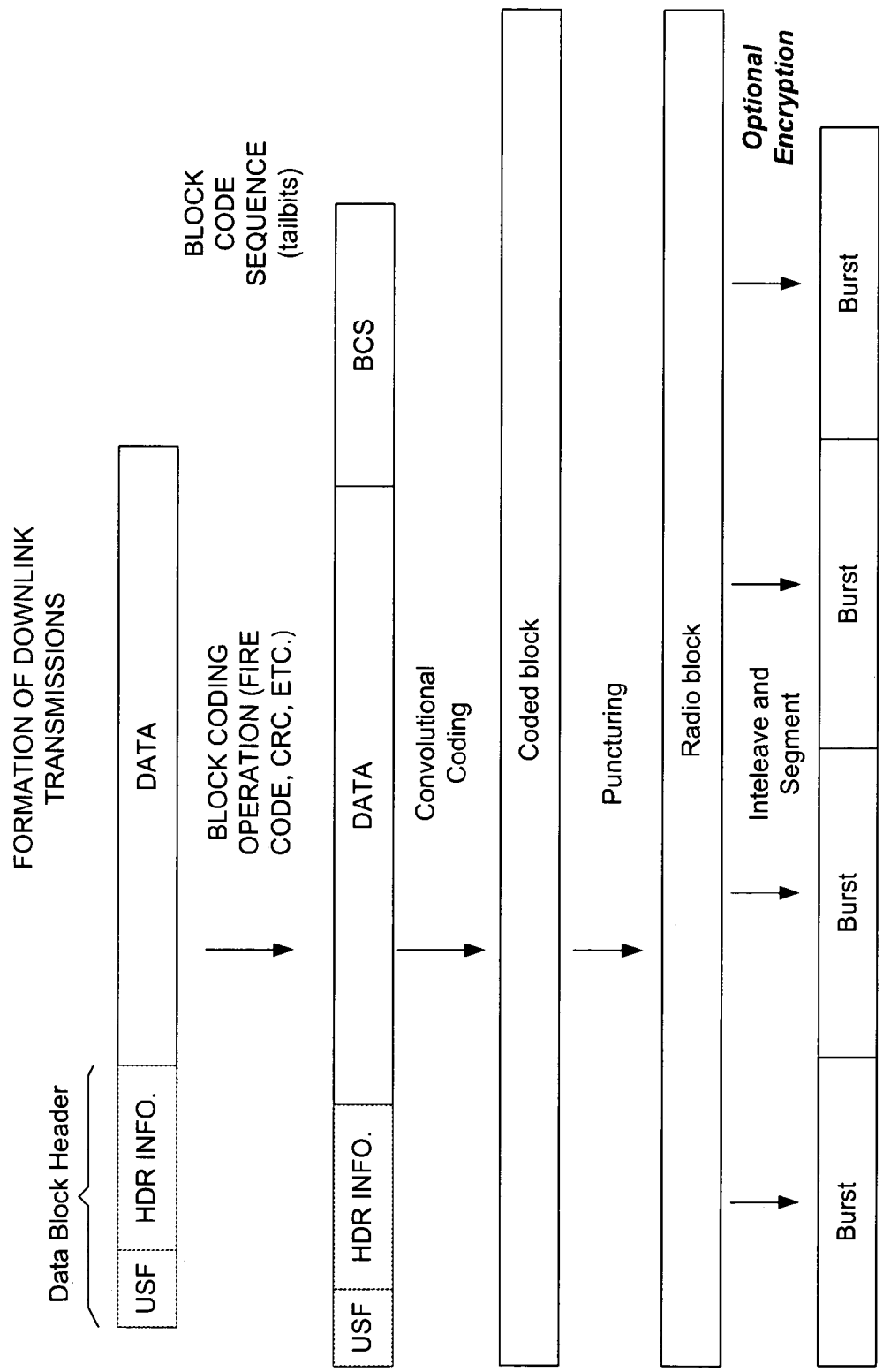
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some redundant bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format. Different methods of determining the modulation format from the training sequence will be described in FIGS. 6A through 10.

Figure 6A:
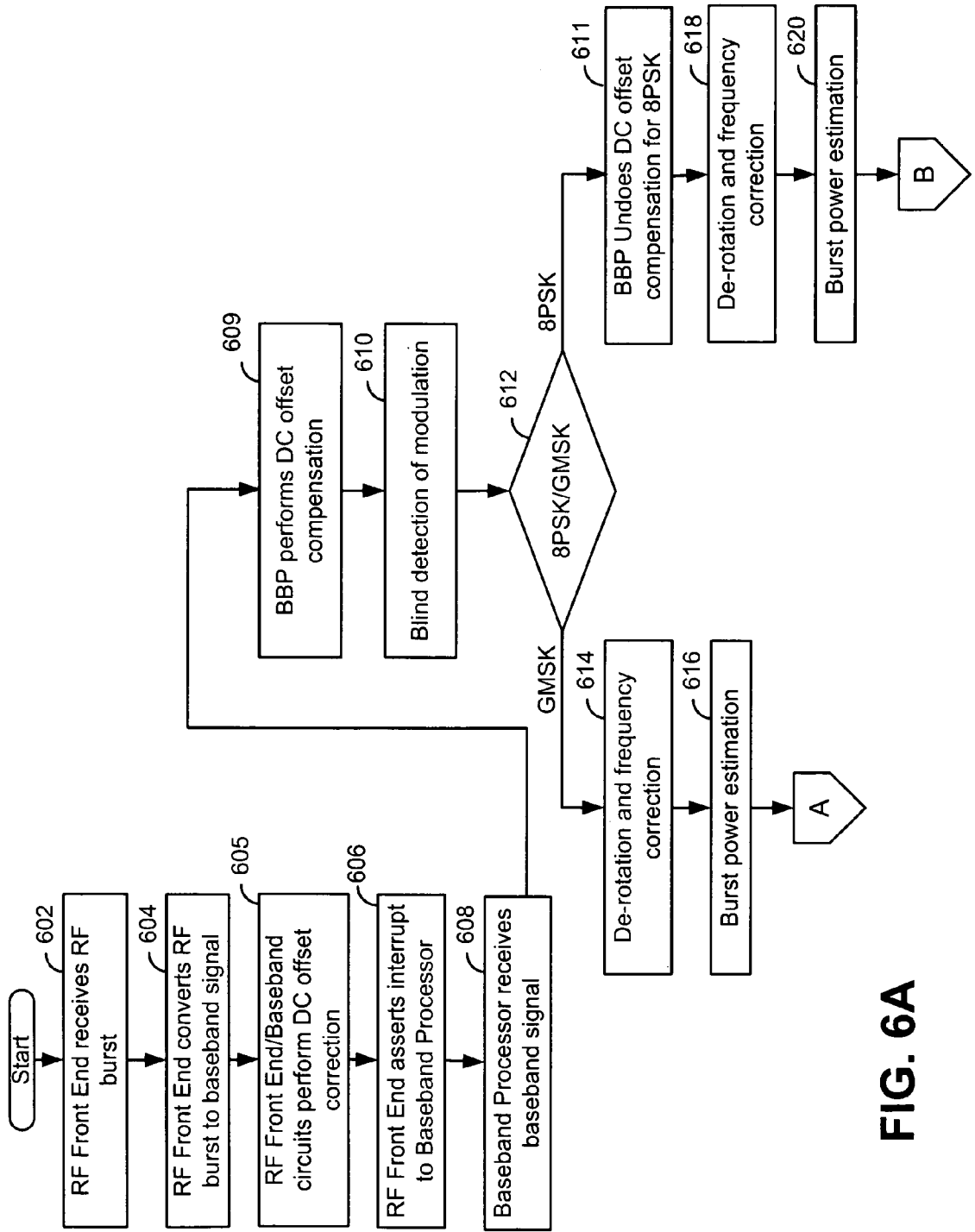
FIGS. 6A and 6B are flow charts illustrating operation of a wireless terminal in receiving and processing a RF burst.
Figure 6B:
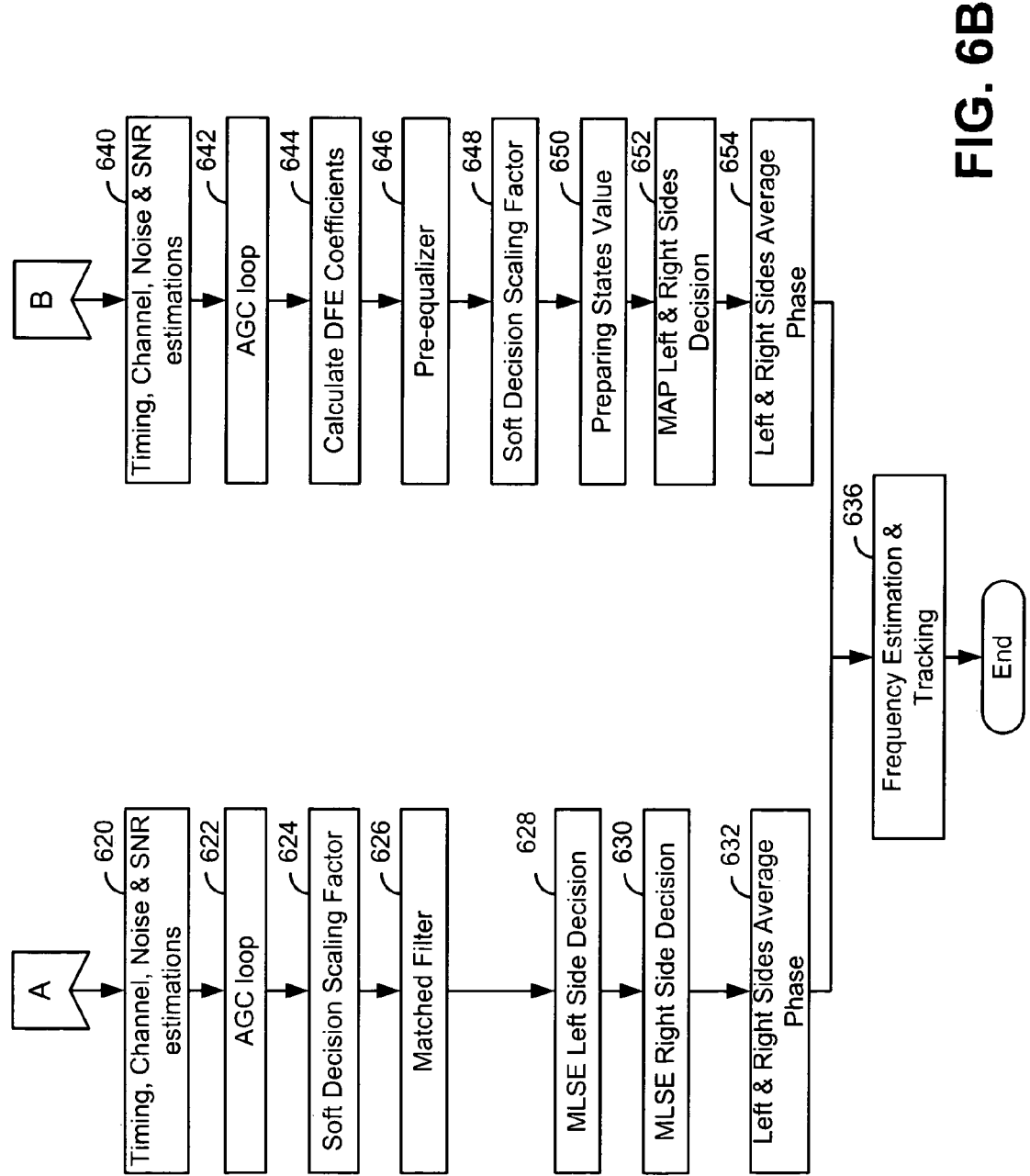

FIGS. 6A and 6B are flow charts illustrating operation of a wireless terminal 200 in receiving and processing a RF burst. The operations illustrated in FIGS. 6A to 6B correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions illustrated in FIGS. 6–10.

Referring particularly to FIG. 6A, operation commences with the RF front end 202 receiving an RF burst in a corresponding slot of a GSM frame (step 602). The RF front end 202 then converts the RF burst to a baseband signal (step 604). RF front end 202 or baseband circuits performs DC offset compensation on all incoming RF signals in step 605. RF front end 202 performs well when the signal to noise ratio (SNR) is high. However, when the SNR is low, RF front end 202 does not perform as well and baseband processor 304 must assist in the DC offset compensation as shown in step 609 and detailed in FIG. 11A. Upon completion of the conversion, the RF front end 202 sends an interrupt to the baseband processor 304 (step 606). Thus, as referred to in FIG. 6A, the RF front end 202 performs steps 602–606.

Figure 8:
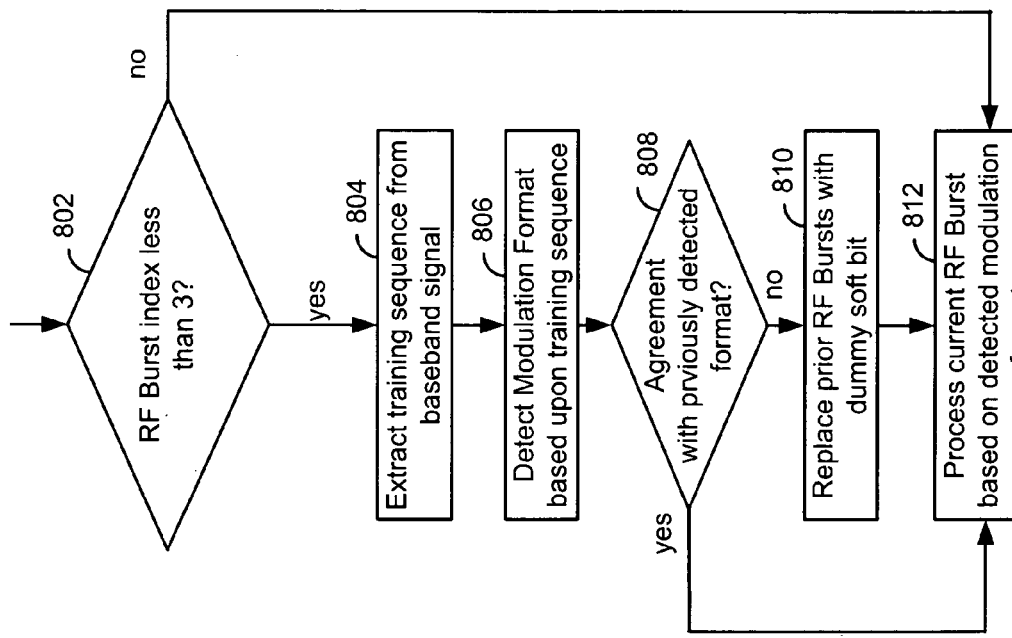
FIG. 8 is a flow chart illustrating operations to detect the modulation format of an RF burst according to an embodiment of the present invention.
Figure 9:
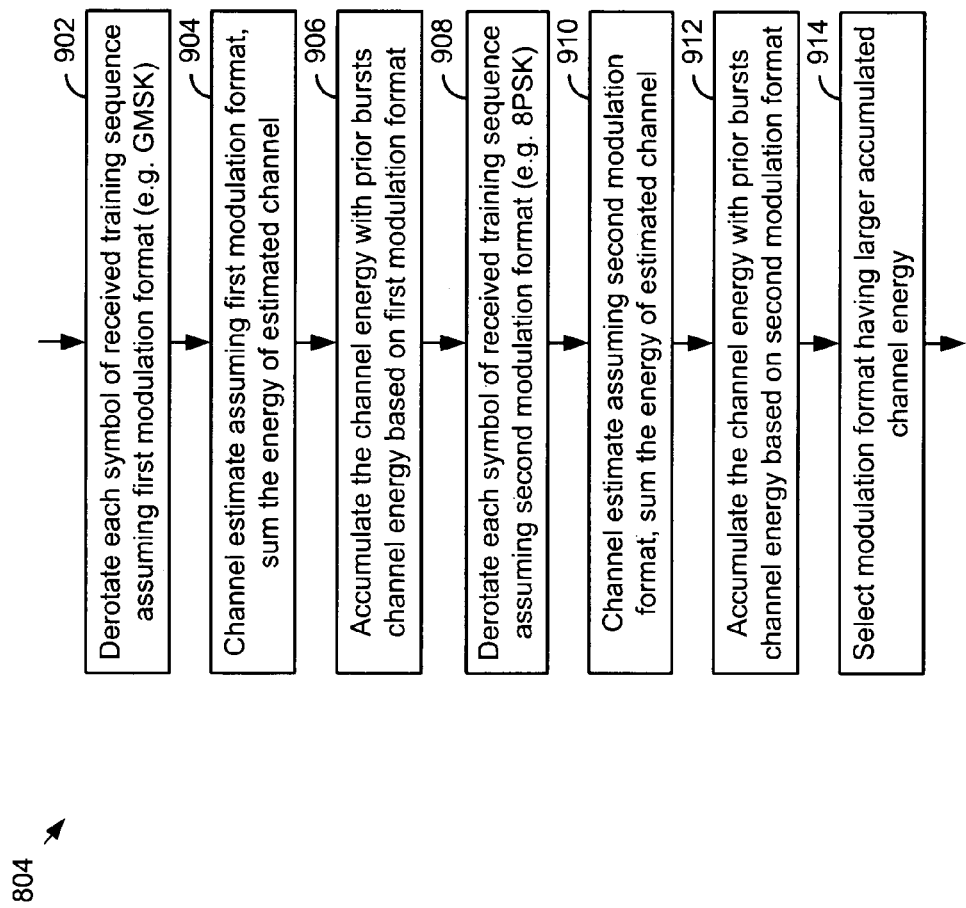
FIG. 9 is a flow chart illustrating operations in further detail that detect the modulation format of an RF burst according to an embodiment of the present invention.
Figure 10:
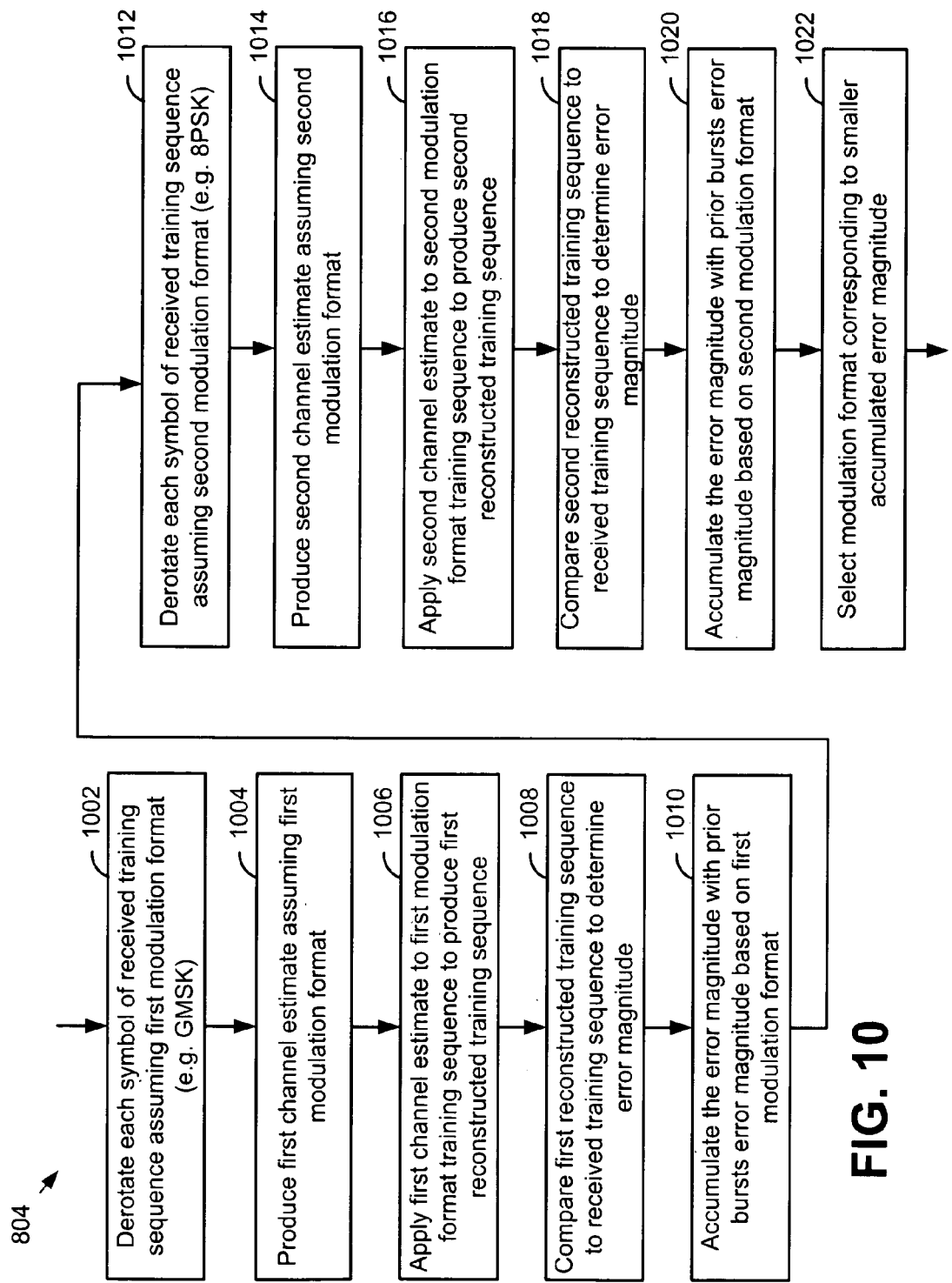
FIG. 10 is a flow chart illustrating operations in further detail that detect the modulation format of an RF burst according to an embodiment of the present invention.

Operation continues with the baseband processor 304 receiving the baseband signal (step 608). In a typical operation, either the RF front end 202, the baseband processor 304, or modulator/demodulator 322 will sample the analog baseband signal to digitize the baseband signal. After receipt of the baseband signal (in a digitized format), the baseband processor 304 performs blind detection of a modulation format of the baseband signal (step 610). This blind detection of the modulation format determines the modulation format of the corresponding baseband signal. FIGS. 8, 9, and 10 describe processes used to determine the modulation format and are described later in further detail. In one particular embodiment according to the GSM standard, the modulation format will be either Gaussian Minimum Shift Keying (GMSK) modulation or Eight Phase Shift Keying (8PSK) modulation. The baseband processor 304 makes the determination (step 612) and proceeds along one of two branches based upon the detected modulation format.

In step 611, which is detailed in FIG. 11B, when a determination is made that GMSK modulation or other more robust modulation schemes were employed, then the process will assume that RF front end 202 did not perform the DC offset compensation satisfactorily. The RF front end introduces DC offset into the baseband signal, typically during the mixing process/processes. However, the presence of DC offset in the baseband signal may cause modulation format detection problems, demodulation problems, and generally impedes the ability of the receiver to correctly extract received data. As the DC offset is typically worse for noisy channels in which a DC baseline cannot be determined by the RF front end, low SNR baseband signals often have greater DC offset than high SNR baseband signals. For example, GMSK modulation or other more robust modulation schemes are typically used for noisy channels. While 8PSK modulation or other less robust modulation schemes are typically used in less noisy channels. As such, the DC offset compensation performed by baseband processor 304 will remain in the output signal. However, if a determination is made that 8PSK modulation or other less robust modulation schemes were employed, then the process assumes that RF front end 202 did perform the DC offset compensation satisfactorily. RF front end 202 typically introduces less DC offset into higher SNR signals. Taking out DC offset from an 8PSK signal may make the signal worse off. As such, the DC offset compensation performed by baseband processor 304 is not necessary and the DC offset compensation performed by baseband processor 304 may be removed from the output signal in step 611.

For GMSK modulation, the baseband processor 304 performs de-rotation and frequency correction of the baseband signal (step 614). Next, the baseband processor 304 performs burst power estimation of the baseband signal (step 616). Referring now to FIG. 6B via off page connector A, the baseband processor 304 next performs timing, channel, noise, and signal-to-noise ratio (SNR) estimation (step 620). Subsequently, the baseband processor 304 performs automatic gain control (AGC) loop calculations (step 622). Next, the baseband processor 304 performs soft decision scaling factor determination on the baseband signal (step 624). After step 624, the baseband processor 304 performs matched filtering operations on the baseband signal (step 626).

Steps 608–626 are referred to hereinafter as pre-equalization processing operations. With the baseband processor 304 performing these pre-equalization processing operations on the baseband signal, baseband processor 304 produces a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation. The equalizer module 318 receives the processed baseband signal, settings, and/or parameters from the baseband processor 304 and performs Maximum Likelihood Sequence Estimation (MLSE) equalization on the left side of the baseband signal (step 628). As was shown previously with reference to FIG. 4, each RF burst contains a left side of data, a midamble, and a right side of data. The midamble includes predefined training sequence that may be based on the modulation format. At step 628, the equalizer module 318 equalizes the left side of the RF burst to produce soft decisions for the left side. Then, the equalizer module 318 equalizes the right side of the processed baseband signal (step 630). The equalization of the right side produces a plurality of soft decisions corresponding to the right side.

The equalizer module 318 then issues an interrupt to the baseband processor 304 indicating that the equalizer operations are complete for the RF burst. The baseband processor 304 then receives the soft decisions from the equalizer module 318. Next, the baseband processor 304 determines an average phase of the left and right sides based upon the soft decisions received from the equalizer module 318 (step 632). The baseband processor 304 then performs frequency estimation and tracking based upon the soft decisions received from the equalizer module 318 (step 636). The operations of step 632 (or step 654) and step 636 are referred to herein as "post-equalization processing." After operation at step 636, processing of the particular RF burst is completed.

Referring again to FIG. 6A, the baseband processor 304 and equalizer module 318 take the right branch from step 612 when an 8PSK modulation is blindly detected at step 610. In the first operation for 8PSK modulation, the baseband processor 304 performs de-rotation and frequency correction on the baseband signal (step 618). The baseband processor 304 then performs burst power estimation of the baseband signal (step 620). Referring now to FIG. 6B via off page connector B, operation continues with the baseband processor 304 performing timing, channel, noise, and SNR estimations (step 640). The baseband processor 304 then performs AGC loop calculations on the baseband signal (step 642). Next, the baseband processor 304 calculates Decision Feedback Equalizer (DFE) coefficients that will be used by the equalizer module 318 (step 644). The baseband processor 304 then performs pre-equalizer operations on the baseband signal (step 646). Finally, the baseband processor 304 determines soft decision scaling factors for the baseband signal (step 648). Steps 618–648 performed by the baseband processor 304 are referred to herein as "pre-equalization processing" operations for an 8PSK modulation baseband signal. Upon completion of step 648, the baseband processor 304 issues a command to equalizer module 318 to equalize the processed baseband signal.

Upon receipt of the command from the baseband processor 304, the equalizer module 318 receives the processed baseband signal, settings, and/or parameters from the baseband processor 304 and commences equalization of the processed baseband signal. The equalizer module 318 first prepares state values that it will use in equalizing the 8PSK modulated processed baseband signal (step 650). In the illustrated embodiment the equalizer module 318 uses a Maximum A posteriori Probability (MAP) equalizer. The equalizer module 318 then equalizes the left and right sides of the processed baseband signal using the MAP equalizer to produce soft decisions for the processed baseband signal (step 652). Upon completion of step 654, the equalizer module 318 issues an interrupt to the baseband processor 304 indicating its completion of equalizing the processed baseband signal corresponding.

The baseband processor 304 then receives the soft decisions from the equalizer module 318. Next, the baseband processor 304 determines the average phase of the left and right sides of the processed baseband signal based upon the soft decisions (step 654). Finally, the baseband processor 304 performs frequency estimation and tracking for the receiver. (Step 636) The operations of steps 654 and 636 are referred to as post-equalization processing operations. From step 636, operation is complete for the particular RF burst depicts the various stages associated with recovering a data block from an RF Burst.

While the operations of FIGS. 6A and 6B are indicated to be performed by particular components of the wireless terminal, such segmentation of operations could be performed by differing components. For example, the equalization operations could be performed by the baseband processor 304 or system processor 302 in other embodiments. Further, the baseband processor 304 or the system processor 302 in other embodiments could also perform decoding operations.

Figure 7:
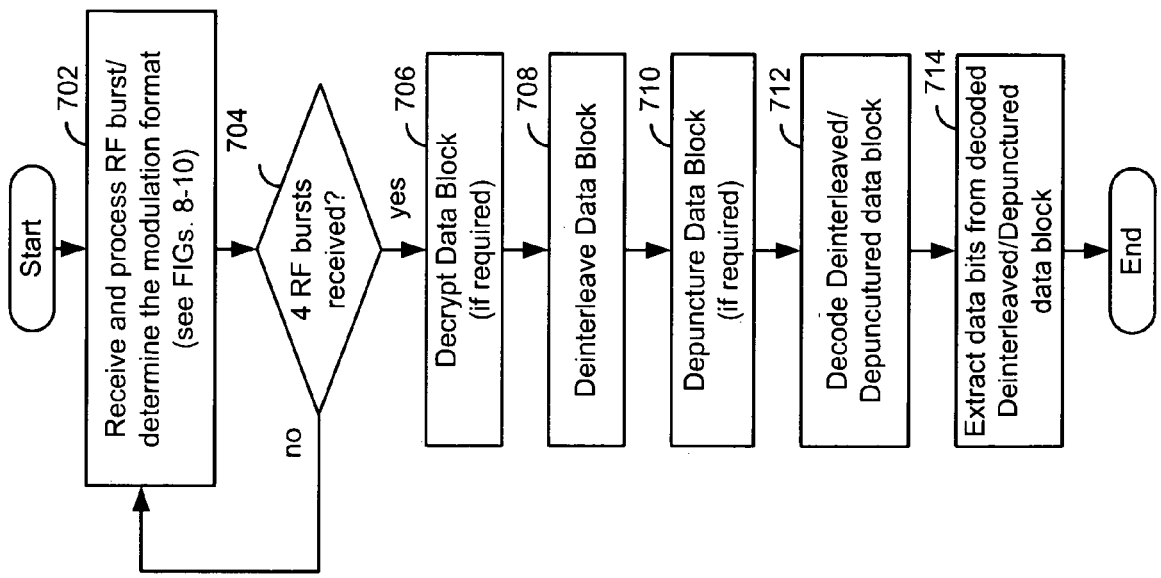
FIG. 7 is a flow chart illustrating operations to recover a data block according to an embodiment of the present invention.

FIG. 7 is a flow chart illustrating operations to decode a data block according to an embodiment of the present invention. Operations commence with receiving and processing an RF burst in step 702 and as described with reference to FIGS. 6A and 6B. This includes determining the modulation format in order to properly demodulate the RF burst(s) as described in FIGS. 8–10. After receiving the four RF bursts that complete an EDGE or GPRS data block, as determined at step 704, operation proceeds to step 706.

A header of the data block identifies the coding scheme and puncturing pattern of the data block. For example, the coding scheme may be any one of the CS-1 through CS-4 or MCS-1 through MCS-9 coding schemes, each of which may include multiple puncturing patterns. Operation according to the present invention uses the training sequence of each RF burst, located within the midamble of the RF burst, to identify the modulation format of the RF burst.

Data recovery begins in step 706 where, if necessary, the data block is decrypted. The data block is then de-interleaved (step 708) according to a particular format of the data block, e.g. MCS-1 through MCS-9 or CS-1 through CS-4. The data block is then de-punctured (step 710). At step 712, the de-interleaved and de-punctured data block is decoded. Decoding operations may include combining previously received copies of the data block with the current copy of the data block. Data bits of the decoded data block are then extracted and processed further (step 714).

FIG. 8 describes one embodiment used to determine a modulation format of a received RF burst (step 610 of FIG. 6A). First, at decision point 802 a determination is made as to which sequential RF Burst from within the data block has been presented for processing. Typically, the data block contains four RF bursts. The RF bursts are indexed as numbers 0, 1, 2, and 3. Only the first 3 RF bursts, 0; 1, and 2, are used in this embodiment to perform modulation format detection. If the RF burst is indexed as 0, 1, or 2, (less than 3 within the data block), the training sequence is extracted from the baseband signal in step 804. The modulation format is detected based upon the training sequence in step 806. Particular embodiments for performing step 806 are described further in FIGS. 9 and 10. When the RF burst is the first RF burst of a data block made up of multiple RF bursts the modulation format detected in step 806 is used to process the RF burst. However, if the RF burst is not the first RF burst of a corresponding data block, a determination is made at decision point 808 as to whether or not the detected modulation format agrees with the modulation format that was determined for one or more prior RF bursts. When agreement exists, the agreed modulation format is used to process the RF burst in step 812.

However, if agreement does not exist at decision point 808 between the current RF burst and prior RF burst(s), several options exist. As shown in step 810 the detected soft bits of prior RF Bursts may be discarded by replacing them with dummy soft bits. Alternatively, the processor may select the most likely modulation format and then reprocess or discard prior RF bursts based on which modulation format is the most likely modulation format. With one embodiment, the soft decisions of the prior burst are discarded when the subsequently determined modulation format differs from the previously determined modulation format. With this operation, any information contained in the prior RF bursts is lost and it is assumed that a coding scheme is robust enough that the data block can still be decoded correctly with remaining RF bursts. In another embodiment, the prior RF burst is reprocessed based on the newly selected modulation format. This reprocessing may be required for less robust coding schemes. Such reprocessing ensures all of the available information from the RF burst to be captured. Reprocessing would typically be performed by re-equalizing the samples of the RF burst FIG. 9 illustrates a first embodiment of step 804. In this embodiment, the training sequence is extracted from the RF burst. This involves de-rotating each symbol with the rotation frequency of the first modulation format, e.g., GMSK as shown in step 902. The CIR is estimated based on the de-rotated training sequence, and the channel energy is generated based on the estimated CIR assuming the first modulation format in step 904. The channel energy may be accumulated with the channel energies of prior bursts of the same data block to produce all accumulated channel energy in step 906. Next, the training sequence is processed assuming a second modulation format in steps 908, 910 and 912. This involves de-rotating each symbol of the training sequence with the rotation frequency of the second or alternative modulation format beginning with step 908. For example, 8PSK may be used in the second case. The CIR is estimated based on the de-rotated training sequence, and the channel energy is generated based on the estimated CIR assuming the second modulation format in step 904. The channel energy may be accumulated with the channel energies of prior bursts of the same data block to produce a second accumulated channel energy in step 912. In step 914, a determination as to which modulation format resulted in a greater channel energy or accumulated channel energy. The modulation format corresponding to the greater accumulated channel energy is then selected as the modulation format of the RF burst(s). At the first RF burst of the data block, the two channel energy accumulation registers are reset as 0.

FIG. 10 illustrates a second embodiment of step 804. This involves de-rotating each symbol in the training sequence with the rotation frequency of the first modulation format, e.g., GMSK as shown in step 1002. A first channel estimate is produced in step 1004 based upon the de-rotated training sequence first modulation format, e.g., GMSK. The first channel estimate is then applied to a reference training sequence of the first modulation format to produce a first reconstructed training sequence at step 1006. The first reconstructed training sequence is compared to the de-rotated training sequence to determine an error magnitude associated with the RF Burst in step 1008. The error magnitude may be accumulated with the error magnitudes of prior bursts of the same data block to produce a first accumulated error magnitude in step 1010. Next, each symbol is de-rotated in the training sequence with the rotation frequency of a second modulation format, e.g., 8PSK as shown in step 1012. A second channel estimate is then produced based upon the received training sequence assuming the second modulation format, e.g., 8PSK, at step 1014. The second channel estimate is then applied to the second modulation format's reference training sequence to produce a second reconstructed training sequence at step 1016. The second reconstructed training sequence is compared to the de-rotated training sequence to determine an error magnitude associated with the RF Burst in step 1018. The error magnitude may be accumulated with the error magnitudes of prior bursts of the same data block to produce a second accumulated error magnitude in step 1020.

In step 1022, the first accumulated error magnitude is compared to the second accumulated error magnitude. The modulation format corresponding to the lesser-accumulated error magnitude corresponds to the identified modulation format of the RF burst(s). The identified modulation format is then used further in the steps of FIG. 8 following step 804. At the first RF burst of the data block, the two error magnitude accumulation registers are reset as 0.

FIG. 11A provides in further detail a description of how the baseband processor performs the DC offset compensation of step 609 as shown in FIG. 6A. Here in step 1102, the a number of data samples are extracted from the baseband signal. In one embodiment this may constitute the first 128 I and Q samples of the RF Burst. These samples may be extracted from the data portions of the RF Burst. Another embodiment may extract the training sequence from the baseband signal. The I phase and Q phase of the data samples are averaged to produce I phase and Q phase DC offsets in step 1104. In step 1106, the I and Q DC offsets are subtracted from the I and Q data samples to produce I and Q DC offset compensated data samples. In FIG. 11B, step 611 of FIG. 6A, further includes adding back the previously determined DC offset compensation when the RF front is performs the DC offset compensation satisfactorily or the SNR is adequate. For example, such a situation may arise when the 8PSK modulation format is utilized. The process in this case assumes that the RF front end satisfactorily performed the DC offset compensation. Following this assumption, the process adds the previously determined I and Q DC offsets of step 1104 to the I and Q DC compensated RF burst of step 1106 to produce a properly DC offset compensated I and Q RF burst.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to perform direct current (DC) compensation on a Radio Frequency (RF) burst, wherein the RF burst is transmitted between a servicing base station and a wireless terminal in a cellular wireless communication system, the method comprises:
   receiving the RF burst, wherein the RF burst is modulated according to either a first modulation format or a second modulation format;
   producing a plurality of samples from the RF burst;
   averaging at least some of the plurality of samples to produce a DC offset estimate;
   subtracting the DC offset estimate from each of the plurality of samples;
   identifying the modulation format of the RF burst from the plurality of DC offset estimate subtracted samples;
   adding the DC offset estimate to each of the plurality of DC offset estimate subtracted samples when the second modulation format was identified as the modulation format of the RF burst; and
   demodulating the plurality of samples according to the identified modulation format of the RF burst.

2. The method of claim 1, wherein:
   the first modulation format is Gaussian Minimum Shift Keying (GMSK) modulation; and
   the second modulation format is Eight Phase Shift Keying (8PSK) modulation.

3. The method of claim 1, wherein producing the plurality of samples from the RF burst, further comprises:
   processing the RF burst to produce a baseband signal;
   extracting a training sequence from the baseband signal, wherein the training sequence comprises In-phases (I) and Quadrature (Q) phase; and
   sampling the training sequence to produce the plurality of samples, wherein the samples comprise both I phases and Q phases, and wherein the plurality of samples taken over the training sequence are averaged to produce the DC offset estimate.

4. The method of claim 3, wherein the DC offset estimate comprises:
   an I phase DC offset estimate; and
   a Q phase DC offset estimate.

5. The method of claim 1, wherein the DC offset estimate is based upon all samples of the RF burst.

6. The method of claim 1, further comprising:
receiving a subsequent RF burst within the data frame from the servicing base station, wherein the subsequent RF burst carries a plurality of modulated symbols;
determining a first accumulated result from processing the subsequent RF and prior RF bursts according to the first modulation format;
determining a second accumulated result from processing the subsequent RF and prior RF bursts according to the second modulation format;
comparing the first accumulated result and the second accumulated result to determine the more favorable accumulated results;
identifying the modulation format associated with the subsequent RF burst based as the modulation format corresponding to the more favorable accumulated result;
demodulating the subsequent RF burst according to the identified modulation format; and
discarding the RF burst when the identified modulation format of the subsequent RF burst compares unfavorably to the identified modulation format of prior RF bursts.

7. The method of claim 1, further comprising:
receiving a subsequent RF burst within the data frame from the servicing base station, wherein the subsequent RF burst carries a plurality of modulated symbols;
determining a first accumulated result from processing the subsequent RF and prior RF bursts according to the first modulation format;
determining a second accumulated result from processing the subsequent RF and prior RF bursts according to the second modulation format;
comparing the first accumulated result and the second accumulated result to determine the more favorable accumulated results;
identifying the modulation format associated with the subsequent RF burst based as the modulation format corresponding to the more favorable accumulated result;
demodulating the subsequent RF burst according to the identified modulation format; and
reprocessing the RF burst when the identified modulation format of the subsequent RF burst compares unfavorably to the identified modulation format of prior RF bursts.

8. A wireless terminal that comprises:
a Radio Frequency (RF) front end;
a baseband processor communicatively coupled to the RF front end;
an enCOder/DECoder (CODEC) processing module communicatively coupled to the baseband processor;
wherein, the RF front end, the baseband processor, and the CODEC processing module are operable to:
receive a first RF burst, wherein the RF burst is modulated according to either a first modulation format or a second modulation format;
produce a plurality of samples from the first RF burst;
average the plurality of samples to produce a direct current (DC) offset estimate;
subtract the DC offset estimate from each of the plurality of samples;
identify the modulation format of the RF burst from the plurality of DC offset estimated subtracted samples;
add the DC offset estimate to each of the plurality of DC offset estimated subtracted samples when the second modulation format was identified as the modulation format of the RF burst; and
demodulate the RF burst according to the identified modulation format.

9. The wireless terminal of claim 8, wherein:
the first modulation format is Gaussian Minimum Shift Keying (GMSK) modulation; and
the second modulation format is Eight Phase Shift Keying (8PSK) modulation.

10. The wireless terminal of claim 8, wherein, the RF front end, the baseband processor, and the CODEC processing module are further operable to:
process the first RF burst to produce a baseband signal;
extract a training sequence from the baseband signal, wherein the training sequence comprises In-phases (I) and Quadrature (Q) phases; and
sample the training sequence to produce the plurality of samples, wherein the samples comprise both I phases and Q phases, and wherein the plurality of samples taken over the training sequence are averaged to produce the DC offset estimate.

11. The wireless terminal of claim 10, wherein the DC offset estimate comprises:
an I phase DC offset estimate; and
a Q phase DC offset estimate.

12. The wireless terminal of claim 8, wherein, the RF front end, the baseband processor, and the CODEC processing module are further operable to:
receive a subsequent RF burst within the data frame from the servicing base station, wherein the subsequent RF burst carries a plurality of modulated symbols;
determine a first accumulated result from processing the subsequent RF and prior RE bursts according to the first modulation format;
determine a second accumulated result from processing the subsequent RF and prior RF bursts according to the second modulation format;
compare the first accumulated result and the second accumulated result to determine the more favorable accumulated results;
identify the modulation format associated with the subsequent RF burst based as the modulation format corresponding to the more favorable accumulated result;
demodulate the subsequent RF burst according to the identified modulation format; and
discard the first RF burst when the identified modulation format of the subsequent RF burst compares unfavorably to the identified modulation format of the prior RF bursts.

13. The wireless terminal of claim 8, wherein, the RF front end, the baseband processor, and the CODEC processing module are further operable to:
receive a subsequent RF burst within the data frame from the servicing base station, wherein the subsequent RF burst carries a plurality of modulated symbols;
determine a first accumulated result from processing the subsequent RF and prior RF bursts according to the first modulation format;
determine a second accumulated result from processing the subsequent RF and prior RF bursts according to the second modulation format;
compare the first accumulated result and the second accumulated result to determine the more favorable accumulated results;

identity the modulation format associated with the subsequent RF burst based as the modulation format corresponding to the more favorable accumulated result;

demodulate the subsequent RF burst according to the identified modulation format; and reprocess the first RF burst according to the modulation format identified with the subsequent RF burst when the modulation format identified with the subsequent RF burst compares unfavorably to the modulation format identified with the first RF burst.

14. The wireless terminal of claim 8, wherein the wireless terminal operates according to the Global System for Mobile telecommunications (GSM) standard.

15. A wireless terminal that comprises:
a Radio Frequency (RF) front end;
a baseband processor communicatively coupled to the RF front end;
wherein, the RF front end and the baseband processor are operable to:
receive a first RF burst, wherein the RF burst is modulated according to either a first modulation format or a second modulation format;
produce a plurality of samples from the first RF burst;
average the plurality of samples to produce a direct current offset estimate;
subtract the DC offset estimate from each of the plurality of samples;
identify the modulation format of the RF burst from the plurality of DC offset estimate subtracted samples;
add the DC offset estimate to each of the plurality of DC offset estimate subtracted samples when the second modulation format was identified as the modulation format of the RF burst; and
demodulate the RF burst according to the identified modulation format.

16. The wireless terminal of claim 15, wherein:
the first modulation format is Gaussian Minimum Shift Keying (GMSK) modulation; and
the second modulation format is Eight Phase Shift Keying (8PSK) modulation.

17. The wireless terminal of claim 15, wherein, the RF front end and the baseband processor are further operable to:
process the first RF burst to produce a baseband signal;
extract a training sequence from the baseband signal, wherein the training sequence comprises In-phases (I) and Quadrature (Q) phases; and
sample the training sequence to produce the plurality of samples, wherein the samples comprise both I phases and Q phases, and wherein the plurality of samples taken over the training sequence are averaged to produce the DC offset estimate.

18. The wireless terminal of claim 17, wherein the DC offset estimate comprises:
an I phase DC offset estimate; and
a Q phase DC offset estimate.

19. The wireless terminal of claim 15, wherein, the RF front end and the baseband processor are further operable to:
receive a subsequent RF burst within the data frame from the servicing base station, wherein the subsequent RF burst carries a plurality of modulated symbols;
determine a first accumulated result from processing the subsequent RF and prior RF bursts according to the first modulation format;
determine a second accumulated result from processing the subsequent RF and prior RF bursts according to the second modulation format;
compare the first accumulated result and the second accumulated result to determine the more favorable accumulated results;
identify the modulation format associated with the subsequent RF burst based as the modulation format corresponding to the more favorable accumulated result;
demodulate the subsequent RF burst according to the identified modulation format; and
discard the first RF burst according to the modulation format identified with the subsequent RF burst when the modulation format identified with the subsequent RF burst compares unfavorably to the modulation format identified with the first RF burst.

20. The wireless terminal of claim 15, wherein, the RF front end and the baseband processor are further operable to:
receive a subsequent RF burst within the data frame from the servicing base station, wherein the subsequent RF burst carries a plurality of modulated symbols;
determine a first accumulated result from processing the subsequent RF and prior RF bursts according to the first modulation format;
determine a second accumulated result from processing the subsequent RF and prior RF bursts according to the second modulation format;
compare the first accumulated result and the second accumulated result to determine the more favorable accumulated results;
identify the modulation format associated with the subsequent RF burst based as the modulation format corresponding to the more favorable accumulated result;
demodulate the subsequent RF burst according to the identified modulation format; and
reprocess the first RF burst according to the modulation format identified with the subsequent RF burst when the modulation format identified with the subsequent RF burst compares unfavorably to the modulation format identified with the first RF burst.

21. The wireless terminal of claim 15, wherein the wireless terminal operates according to the Global System for Mobile telecommunications (GSM) standard.

22. A method to perform direct current (DC) compensation on a Radio Frequency (RF) burst, the method comprises:
receiving the RF burst, wherein the RF burst is modulated according to either a first modulation format or a second modulation format;
producing a plurality of samples from the RF burst;
averaging at least some of the plurality of samples to produce a DC offset estimate;
subtracting the DC offset estimate from each of the plurality of samples;
identifying the modulation format of the RF burst from the plurality of DC offset estimate subtracted samples;
adding the DC offset estimate to each of the plurality of DC offset estimate subtracted samples when the second modulation format was identified as the modulation format of the RF burst; and
demodulating the plurality of samples according to the identified modulation format of the RF burst.

23. A method to perform direct current (DC) compensation on a communications burst, the method comprises:
receiving the RF burst, wherein the RF burst is modulated according to either a first modulation format or a second modulation format;

producing a plurality of samples from the RF burst;
averaging at least some of the plurality of samples to produce a DC offset estimate;
subtracting the DC offset estimate from each of the plurality of samples;
identifying the modulation format of the RF burst from the plurality of DC offset estimate subtracted samples;

adding the DC offset estimate to each of the plurality of DC offset estimate subtracted samples when the second modulation format was identified as the modulation format of the RF burst; and
demodulating the plurality of samples according to the identified modulation format of the RF burst.

* * * * *

UNITED STATES PATENT AND TRADEMARK OFFICE
CERTIFICATE OF CORRECTION

PATENT NO.       : 7,068,735 B2                                      Page 1 of 1
APPLICATION NO.  : 10/786376
DATED            : June 27, 2006
INVENTOR(S)      : Baoguo Yang et al.

It is certified that error appears in the above-identified patent and that said Letters Patent is hereby corrected as shown below:

Column 14, line 56, in Claim 3: replace "phase;" with --phases;--

Signed and Sealed this

Twenty-ninth Day of July, 2008

JON W. DUDAS
*Director of the United States Patent and Trademark Office*